United States Patent [19]
Iwasaki

[11] Patent Number: 6,084,851
[45] Date of Patent: Jul. 4, 2000

[54] DEMODULATING METHOD AND APPARATUS, RECEIVING METHOD AND APPARATUS, AND COMMUNICATION APPARATUS

[75] Inventor: Jun Iwasaki, Tokyo, Japan

[73] Assignee: Sony Corporation, Tokyo, Japan

[21] Appl. No.: 09/007,703

[22] Filed: Jan. 15, 1998

[30] Foreign Application Priority Data

Jan. 21, 1997 [JP] Japan ................................. 9-008919

[51] Int. Cl.⁷ ................................................... G08C 13/02
[52] U.S. Cl. ........................................... 370/204; 370/208
[58] Field of Search ...................................... 370/335, 342, 370/441, 208, 204, 209; 375/200, 208, 210, 206

[56] References Cited

U.S. PATENT DOCUMENTS

| | | | |
|---|---|---|---|
| 5,305,349 | 4/1994 | Dent | 370/209 |
| 5,329,547 | 7/1994 | Ling | 370/342 |
| 5,579,304 | 11/1996 | Sugimoto et al. | 370/342 |

*Primary Examiner*—Hassan Kizou
*Assistant Examiner*—Mitchell Slavitt
*Attorney, Agent, or Firm*—Jay H. Maioli

[57] ABSTRACT

A selector that selects an orthogonally detected output signal of I channel and an orthogonally detected output signal of Q channel and that outputs the selected signals to a path for obtaining a demodulated output signal of I channel is provided. In addition, a selector that selects an orthogonally detected output signal of Q channel and an orthogonally detected output signal of I channel and that outputs the selected signals to a path for obtaining a demodulated output signal of Q channel is provided. These selectors are switched corresponding to whether or not a PN code of I channel is the same as a PN code of Q channel. An output signal of the selector of the path for obtaining the demodulated output signal of I channel and the PN code of Q channel PNQ are ex-ORed and output as a de-spread output signal of I channel. An output signal of the selector of the path for obtaining the demodulated output signal of Q channel and the PN code PNI of I channel are ex-ORed and output as a de-spread output signal of Q channel.

25 Claims, 7 Drawing Sheets

Fig. 7

| | | |
|---|---|---|
| 0 1 1 1 | +7.5 | |
| 0 1 1 0 | +6.5 | |
| 0 1 0 1 | +5.5 | |
| 0 1 0 0 | +4.5 | POSITIVE |
| 0 0 1 1 | +3.5 | |
| 0 0 1 0 | +2.5 | |
| 0 0 0 1 | +1.5 | |
| 0 0 0 0 | +0.5 | |
| 1 1 1 1 | −0.5 | |
| 1 1 1 0 | −1.5 | |
| 1 1 0 1 | −2.5 | |
| 1 1 0 0 | −3.5 | NEGATIVE |
| 1 0 1 1 | −4.5 | |
| 1 0 1 0 | −5.5 | |
| 1 0 0 1 | −6.5 | |
| 1 0 0 0 | −7.5 | |

DEMODULATING METHOD AND APPARATUS, RECEIVING METHOD AND APPARATUS, AND COMMUNICATION APPARATUS

BACKGROUND OF THE INVENTION

1. Field of the Invention

The present invention relates to a receiving apparatus suitable for a CDMA (Code Division Multiple Access) type cellular telephone system, a receiving method thereof, and a terminal unit for use with a radio system thereof.

2. Description of the Related Art

In recent years, a CDMA type cellular telephone system has become attractive. In the CDMA type cellular telephone system, a pseudo-random code is used as a spread code. A carrier of a transmission signal is spectrum-spread. The pattern and phase of each spread code in the code sequence are varied so as to perform a multiple access.

In the CDMA system, the spectrum spread method is used. In the spectrum spread system, when data is transmitted, the carrier is primarily modulated with the transmission data. In addition, the carrier that has been primarily modulated is multiplied by a PN (Pseudorandom Noise) code. Thus, the carrier is modulated with the PN code. As an example of the primarily modulating method, balanced QPSK modulating method is used. Since the PN code is a random code, when the carrier is modulated by the PN code, the frequency spectrum is widened. When data is received, the received data is multiplied by the same PN code that has been modulated on the transmission side. When the same PN code is multiplied and the phase is matched, the received data is de-spread.

In the spectrum spread method, to de-spread the received signal, the same PN code that has been modulated on the transmission side is required for both the pattern and the phase. Thus, when the pattern and the phase of the PN code are varied, the multiple access can be performed. The method for varying the pattern and the phase of each spread code in the code sequence and thereby performing the multiple access is referred to as CDMA method.

As cellular telephone systems, an FDMA (Frequency Division Multiple Access) system and a TDMA (Time Division Multiple Access) system have been used.

However, the FDMA system and the TDMA system cannot deal with a drastic increase of the number of users.

In other words, in the FDMA system, the multiple access is performed on different frequency channels. In an analog cellular telephone system, the FDMA system is usually used.

However, in the FDMA system, since the frequency use efficiency is bad, a drastic increase of the number of users tends to cause channels to run short. When the intervals of channels are narrowed for the increase of the number of channels, the adjacent channels adversely interfere with each other and thereby the sound quality deteriorates.

In the TDMA system, the transmission data is compressed on the time base. Thus, the use time is divided and thereby the same frequency is shared. The TDMA system has been widely used as a digital cellular telephone system. In the TDMA system, the frequency use efficiency is improved in comparison with the simple FDMA system. However, in the TDMA system, the number of channels is restricted. Thus, it seems that as the number of users drastically increases, the number of channels runs short.

On the other hand, in the CDMA system, the frequency use efficiency improves and more channels can be obtained.

As described above, in the spectrum spreading system, when a signal is transmitted, it is modulated corresponding to for example BQPSK (Balanced Quadrature Phase Shift Keying) method. In addition, a carrier is multiplied by a PN code. Thus, the signal is spectrum-spread. When a signal is received, it is de-spread with the same PN code that has been used on the transmitter side.

FIG. 1 shows a spreading process on the transmitter side in the case that a signal is modulated and spread corresponding to the BQPSK method. In FIG. 1, input data received from an input terminal 120 is separated into data of I channel and data of Q channel. The data of I channel is supplied to a multiplying circuit 123. The data of Q channel is supplied to a multiplying circuit 124.

A PN code generating circuit 121 supplies a PN code of I channel PNI to the multiplying circuit 123. The multiplying circuit 123 multiplies the data of I channel received from the input terminal 120 by the PN code of I channel PNI received from the PN code generating circuit 121. Output data of the multiplying circuit 123 is supplied to a multiplying circuit 127.

A PN code generating circuit 122 supplies a PN code of Q channel PNQ to the multiplying circuit 124. The multiplying circuit 124 multiplies data received from the input terminal 120 by the PN code of Q channel PNQ received from the PN code generating circuit 122. Output data of the multiplying circuit 124 is supplied to a multiplying circuit 128.

A signal generating circuit 125 generates a carrier signal and supplies the carrier signal to the multiplying circuit 128. In addition, the signal generating circuit 125 supplies the carrier signal to the multiplying circuit 128 through a $\pi/2$ phase shifting circuit 126. The multiplying circuit 127 multiplies output data of the multiplying circuit 123 by the carrier signal received from the signal generating circuit 125. The multiplying circuit 128 multiplies output signal of the multiplying circuit 124 by the carrier signal that has been delayed by $\pi/2$ and received from the signal generating circuit 125.

Output data of the multiplying circuit 127 and output data of the multiplying circuit 128 are supplied to an adding circuit 129. The adding circuit 129 adds the output data of the multiplying circuit 127 and the output data of the multiplying circuit 128. Output data of the adding circuit 129 is obtained from an output terminal 130.

Thus, when a signal is modulated corresponding to the BQPSK method and spectrum-spread, input data is separated into two portions on the transmitter side. The PN code generating circuits 121 and 122 multiply separated data portions by PN codes PNI and PNQ, respectively.

When a signal that has been modulated corresponding to the BQPSK method and spectrum-spread is received, as shown in FIG. 1, the received signal is orthogonally detected. A signal of I channel and a signal of Q channel are detected and multiplied by a PN code of I channel PNI and a PN code of Q channel PNQ.

In other words, FIG. 2 shows a conventional de-spreading process performed when a signal is received. In FIG. 2, a signal is received from an input terminal 151. The received signal is supplied to a multiplying circuit 152. In addition, the received signal is supplied to a multiplying circuit 153. An output signal of a signal generating circuit 154 is supplied to the multiplying circuit 152. The signal generating circuit 154 generates a signal with the same frequency as a carrier frequency of the signal received from the input terminal 151. A signal with the same frequency as the carrier frequency of the received signal is supplied from the signal generating circuit 154 to the multiplying circuit 153 through a π/2 delaying circuit 155.

The multiplying circuits 152 and 153, the signal generating circuit 154, and the π/2 delaying circuit 155 form a semi-synchronous detecting circuit. The semi-synchronous detecting circuit causes the multiplying circuits 152 and 153 to output a signal of I channel and a signal of Q channel, respectively. An output signal of the multiplying circuit 152 is supplied to a multiplying circuit 158 through a low l-ass filter 156. An output signal of the multiplying circuit 153 is supplied to a multiplying circuit 159 through a low pass filter 157.

A PN code generating circuit 160 supplies a PN code of I channel PNI to the multiplying circuit 158. A PN code generating circuit 161 supplies a PN code of Q channel PNQ to the multiplying circuit 159. The multiplying circuit 158 de-spreads data of I channel. The de-spread output data is obtained from an output terminal 163 through a low pass filter 162. The multiplying circuit 159 de-spreads data of Q channel. The de-spread output data is obtained from an output terminal 165 through a low pass filter 164.

Thus, when a signal that has been modulated corresponding to the BQPSK modulation and that has been and spectrum-spread is received, the received signal is orthogonally detected by the semi-synchronous detecting circuit. Thus, the received signal is separated into signals of two channels. The PN codes PNI and PNQ of the PN code generating circuits 158 and 159 are separately multiplied and thereby de-spread. In such a process, when a signal is transmitted, it is calculated on a real plane. In contrast, when a signal is received, it is converted into a complex signal by the semi-synchronous detecting process. Thus, strictly speaking, the received signal is not de-spread.

In other words, on the transmitter side, a signal is spread on a real plane. On the other hand, on the receiver side, a received signal is orthogonally detected by the semi-synchronous detecting process and converted into a complex signal. Thus, the PN code of I channel PNI and the PN code of Q channel PNQ that are real numbers are multiplied by an output signal that is a complex signal of the semi-synchronous detecting circuit. When a real signal is multiplied by a complex signal, the de-spreading process is not performed.

To solve this problem, the applicant of the present invention has proposed a method of which a signal is multiplied by a complex conjugate and thereby de-spread on the receiver side. In other words, considering that all signals are complex numbers, a spreading process is equivalent to a process of which multiplications of complex numbers of PNI and PNQ cause the phases of signalls to be rotated. Thus, to de-spread signals, the phases thereof are inversely rotated.

A signal that has been detected by the semi-synchronous detecting process is treated as a complex number I+jQ.

A PN sequence used for the de-spreading process is represented by a complex number PNI+jPNQ.

The de-spreading process is equivalent to a process of which the phases of signals are inversely rotated.

Thus, the signals are multiplied by a complex conjugate of the PN code. In other words, the following relation is obtained.

$$(I + jQ) \cdot (PNI - jPNQ) = (I \cdot PNI + Q \cdot PNQ) + j(Q \cdot PNI - I \cdot PNQ)$$

Thus, after the I signal and the Q signal have been de-spread, the following results are obtained.

$$I\_OUT = I \cdot PNI + Q \cdot PNQ$$

$$Q\_OUT = Q \cdot PNI - I \cdot PNQ$$

With the above-described calculations, the de-spreading process corresponding to the balanced QPSK method is completed. Thus, when a circuit performs the calculations of the above-described expressions, the de-spreading process can be performed.

FIG. 3 shows the structure of a circuit that performs a de-spreading process corresponding to the calculations of the above-described expressions.

In FIG. 3, a signal received from an input terminal 171 is supplied to a multiplying circuit 172 and a multiplying circuit 173. An output signal of a signal generating circuit 174 is supplied to the multiplying circuit 172. The output signal of the signal generating circuit 174 is supplied to the multiplying circuit 173 through a π/2 delaying circuit 175.

The multiplying circuits 172 and 173, the signal generating circuit 174, and the π/2 delaying circuit 175 form a semi-synchronous detecting circuit. The semi-synchronous detecting circuit causes the multiplying circuits 172 and 173 to output a signal of I channel and a signal of Q channel, respectively.

An output signal of the multiplying circuit 172 is supplied to a multiplying circuit 178 through a low pass filter 176. In addition, the output signal of the multiplying circuit 172 is supplied to a multiplying circuit 179 through thw low pass filter 176. An output signal of the multiplying circuit 173 is supplied to a multiplying circuit 180 through a low pass filter 177. In addition, the output signal of the multiplying circuit 173 is supplied to a multiplying circuit 181 through the low pass filter 177.

A PN code generating circuit 182 outputs a PN code of I channel PNI. The PN code of I channel PNI is supplied to the multiplying circuit 178 and the multiplying circuit 180. A PN code generating circuit 183 outputs a PN code of Q channel PNQ. The PN code of Q channel PNQ is supplied to the multiplying circuit 179 and the multiplying circuit 181.

Output signals of the multiplying circuits 178 and 181 are supplied to an adding circuit 184. An output signal of the adding circuit 184 is obtained as a de-spread output signal of I channel from an output terminal 186. Output signals of the multiplying circuits 180 and 179 are supplied to a subtracting circuit 185. An output signal of the subtracting circuit 185 is obtained as a de-spread output signal of Q channel from an output terminal 187.

Thus, the semi-synchronous detecting circuit composed of the multiplying circuits 172 and 173, the signal generating circuit 174, and the π/2 delaying circuit 175 separates the received signal into a signal of I channel and a signal of Q channel. The signal of I channel is supplied to the multiplying circuits 178 and 179. The signal of Q channel is supplied to the multiplying circuits 180 and 181. The PN code PNI received from the PN code generating circuit 182 is supplied to the multiplying circuits 178 and 180. The code PNQ received from the PN code generating circuit 183 is supplied to the multiplying circuits 179 and 181.

When the received signals of P and Q channels are denoted by P and Q, respectively, the multiplying circuits 178 and 180 output a signal I·PNI and a signal Q·PNI, respectively. The multiplying circuit 179 outputs a signal I·PNQ. The multiplying circuit 181 outputs a signal Q·PNQ.

The adding circuit 184 adds the output signal I·PNI of the multiplying circuit 178 and the output signal Q·PNQ of the multiplying circuit 181. The output signal (I·PNI+Q·PNQ) of the adding circuit 184 is obtained as a de-spread output signal of I channel from the output terminal 186.

The subtracting circuit 185 subtracts the output signal Q·PNI of the multiplying circuit 180 from the output signal I·PNQ of the multiplying circuit 179. The output signal (Q·PNI−I·PNQ) of the subtracting circuit 185 is obtained as a de-spread output signal of Q channel from the output terminal 187.

However, when a signal is multiplied by a complex conjugate and thereby de-spread, at least four multiplying circuits 178 to 181, adding circuit 184, and subtracting circuit 185 are required. Thus, the circuit scale becomes large.

OBJECTS AND SUMMARY OF THE INVENTION

Therefore, an object of the present invention is to provide a receiving apparatus, a receiving method, and a terminal unit for use with a portable telephone system that multiply a signal by a complex conjugate and thereby de-spread the signal and allow the circuit scale to reduce.

The present invention is a demodulating apparatus for demodulating a signal having two orthogonal components, comprising signal generating means for generating a carrier signal, and signal selecting means for inputting two signals and varying generation states of two output signals with the signal generated by the signal generating means, wherein the signal selecting means equivalently calculates a complex conjugate.

The present invention is a receiving apparatus for demodulating a signal having two orthogonal components, comprising receiving means for receiving a high frequency signal and converting the high frequency signal into a low frequency signal, signal generating means for generating a carrier signal, and signal selecting means for inputting two output signals of the receiving means and varying generation states of two output signals corresponding to the signal generated by the signal generating means, wherein the signal selecting means equivalently calculates a complex conjugate.

The present invention is a communication apparatus for demodulating a signal having two orthogonal components, comprising transmitting means for modulating an information signal and transmitting the resultant signal, receiving means for receiving a high frequency signal and converting the high frequency signal into a low frequency signal, signal generating means for generating a carrier signal, and signal selecting means for inputting two output signals of the receiving means and varying generation states of two output signals corresponding to the signal generated by the signal generating means, wherein the signal selecting means equivalently calculates a complex conjugate.

A selector that selects an orthogonally detected output signal of I channel and an orthogonally detected output signal of Q channel and that outputs the selected signals to a path for obtaining a demodulated output signal of I channel is provided. In addition, a selector that selects an orthogonally detected output signal of Q channel and an orthogonally detected output signal of I channel and that outputs the selected signals to a path for obtaining a demodulated output signal of Q channel is provided. These selectors are switched corresponding to whether or not a PN code of I channel is the same as a PN code of Q channel. The switching process of these selectors is equivalent to the substitution of the I axis and Q axis. An output signal of the selector of the path for obtaining the demodulated output signal of I channel and the PN code of Q channel PNQ are ex-ORed and output as a de-spread output signal of I channel. An output signal of the selector of the path for obtaining the demodulated output signal of Q channel and the PN code PNI of I channel are ex-ORed and output as a de-spread output signal of Q channel. Thus, a structure of a circuit that multiplies a signal by a complex conjugate and de-spreads the signal is accomplished without need to use a plurality of multiplying circuits, an adding circuit, and a subtracting circuit. Consequently, the circuit scale can be reduced.

The above, and other, objects, features and advantage of the present invention will become readily apparent from the following detailed description thereof which is to be read in connection with the accompanying drawings.

BRIEF DESCRIPTION OF THE DRAWINGS

FIG. 7 is a table for explaining the de-spreading circuit of the portable telephone terminal unit of CDMA type according to the present invention.

DETAILED DESCRIPTION OF THE PREFERRED EMBODIMENTS

Figure 1:
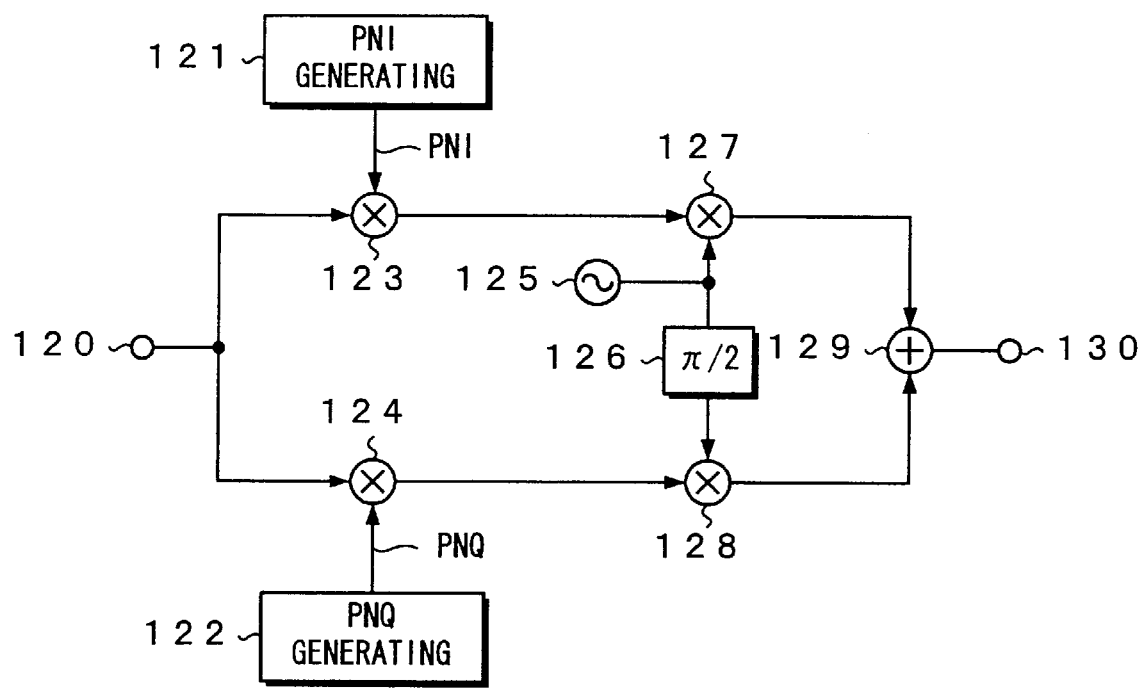
FIG. 1 is a block diagram for explaining a transmitter side of a conventional spectrum spreading system.
Figure 2:
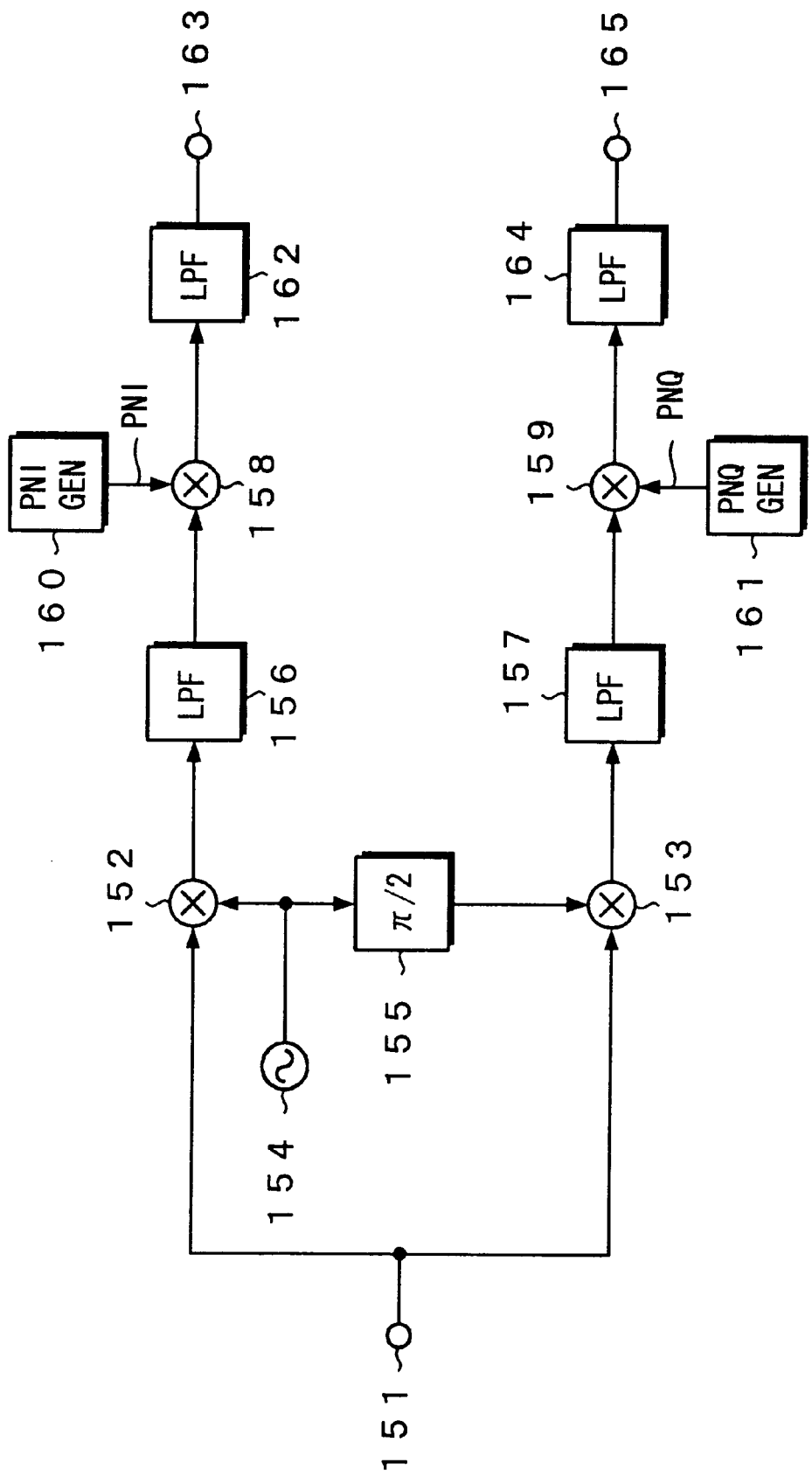
FIG. 2 is a block diagram for explaining an example of the structure of a receiver side of the conventional spectrum spreading system.
Figure 3:
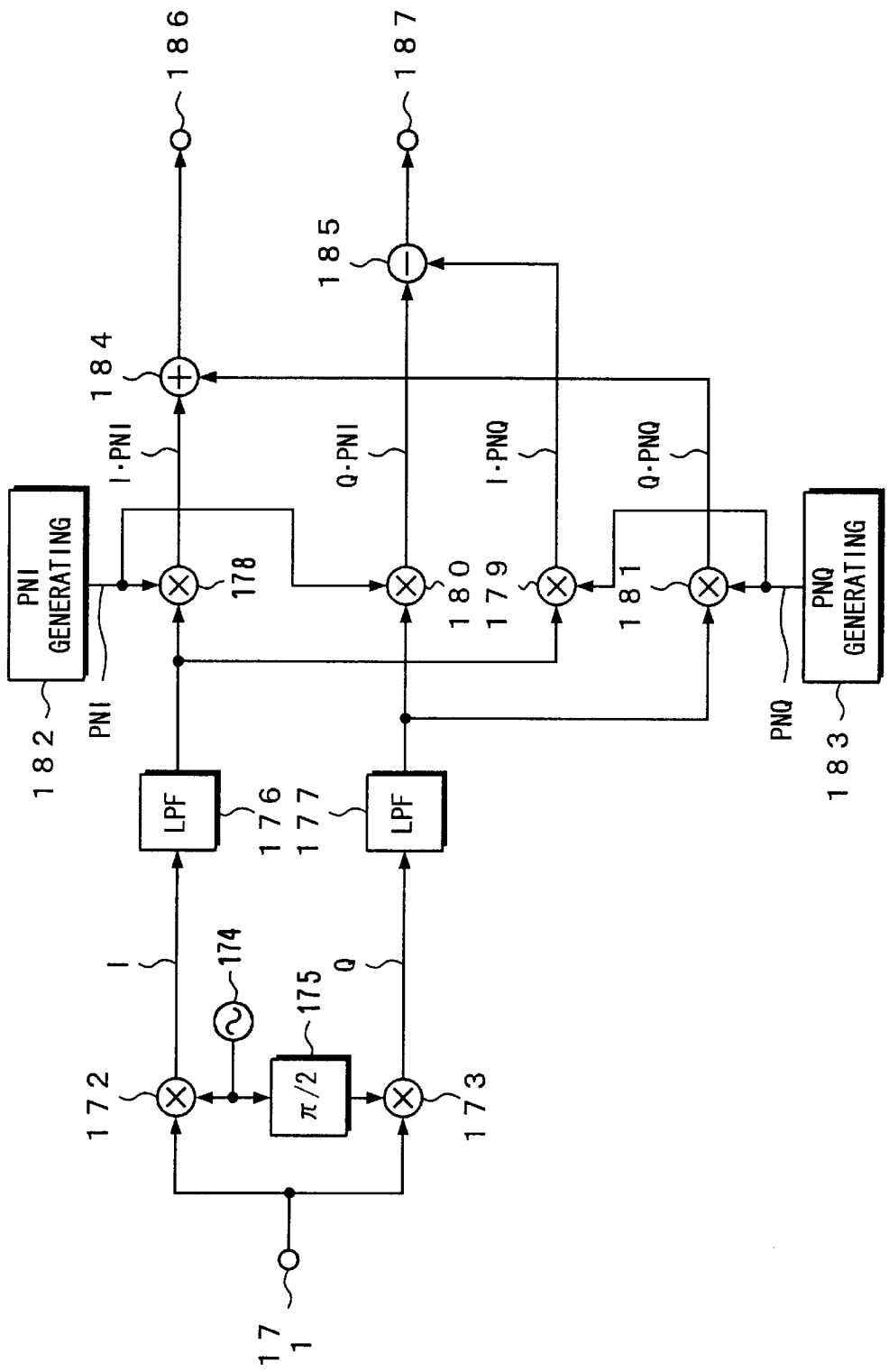
FIG. 3 is a block diagram for explaining another example of the structure of the receiver side of the conventional spectrum spreading system.
Figure 4:
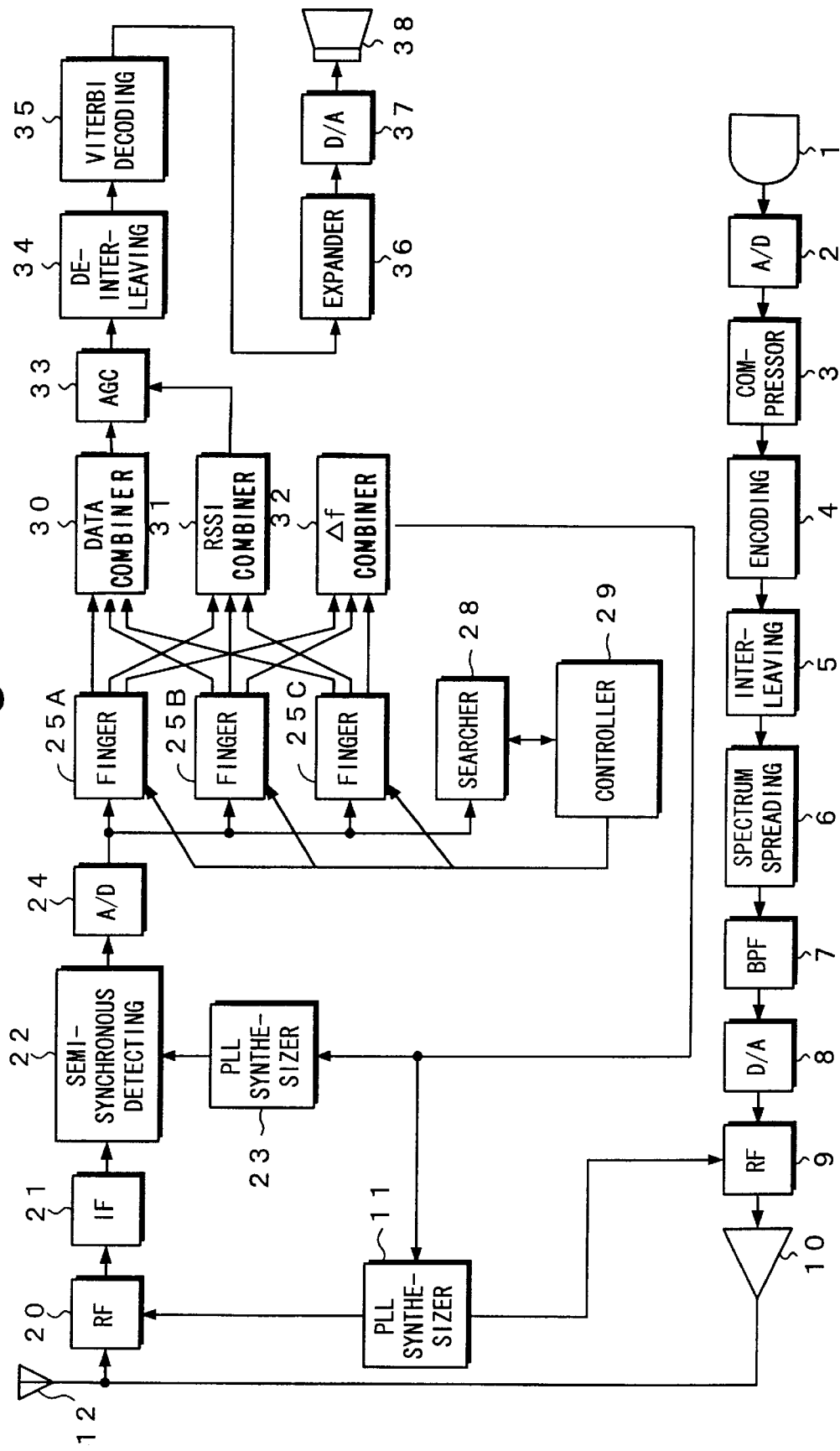
FIG. 4 is a block diagram showing the overall structure of a portable telephone terminal unit of CDMA type according to the present invention.

With reference to the accompanying drawings, an embodiment of the present invention will be described. FIG. 4 is a block diagram showing an example of a portable terminal unit for use with a cellular telephone system of CDMA type according to the present invention. The portable terminal unit uses diversity RAKE system as the receiving system. In the diversity RAKE system, signals are received from a plurality of paths at the same time. The received signals are combined.

In FIG. 4, in the transmission mode, an audio signal is input to a microphone 1. The audio signal is supplied to an A/D converter 2. The A/D converter 2 converts an analog audio signal into a digital audio signal. An output signal of the A/D converter 2 is supplied to a audio compressing circuit 3.

The audio compressing circuit 3 compresses and encodes the digital audio signal. As examples of the compressing and encoding system, various types have been proposed. For example, a system such as QCELP (Qualcomm Code Excited Linear Predictive Coding) system can be used. In the QCELP system, depending on the characteristics of the sound of the user and the congestion state of the communication path, a plurality of encoding speeds can be used. In this case, four encoding speeds (9.6 kbps, 4.8 kbps, 2.4 kbps, and 1.2 kbps) can be selected. To maintain the communication quality, data can be encoded at the minimum speed. It should be noted that the audio compressing system is not limited to the QCELP system.

An output signal of the audio compressing circuit 3 is supplied to a convolutional encoding circuit 4. The convolutional encoding circuit 4 adds an error correction code as a convolutional code to the transmission data. An output signal of the convolutional encoding circuit 4 is supplied to an interleaving circuit 5. The interleaving circuit 5 interleaves the transmission data. An output signal of the interleaving circuit 5 is supplied to a spectrum spreading circuit 6.

The spectrum spreading circuit 6 primarily modulates the carrier and spreads the resultant signal with a PN code. In other words, the spectrum spreading circuit 6 primarily modulates the transmission data corresponding to, for example, balanced QPSK modulating V method. In addition, the resultant signal is multiplied by a PN code. Since the PN code is a random code, when the PN code is multiplied, the frequency band of the carrier is widened. Thus, the carrier is spectrum-spread. As an example of the modulating method for the transmission data, the balanced QPSK modulating method is used.

An output signal of the spectrum spreading circuit 6 is supplied to a D/A converter 8 through a band pass filter 7. An output signal of the D/A converter 8 is supplied to an RF circuit 9.

A local oscillation signal is supplied from a PLL synthesizer 11 to the RF circuit 9. The RF circuit 9 multiplies the output signal of the D/A converter 8 by the local oscillation signal of the PLL synthesizer 11 and thereby converts the frequency of the transmission signal into a predetermined frequency. An output signal of the RF circuit 9 is supplied to an transmission amplifier 10. After the power of the transmission signal is amplified, the resultant signal is supplied to an antenna 12. A radio wave is sent from the antenna 12 to a base station.

In the reception mode, a radio wave sent from a base station is received by the antenna 12. Since the radio wave sent from the base station is reflected by buildings and so forth, the radio wave reaches the antenna 12 of the portable terminal unit through multi-paths. When the portable terminal unit is used in a car or the like, the frequency of the received signal may vary due to the Doppler effect.

The output signal of the antenna 12 is supplied to an RF circuit 20. The RF circuit 20 receives a local oscillation signal from the PLL synthesizer 11. The RF circuit 20 converts the received signal into an intermediate frequency signal with a predetermined frequency.

An output signal of the RF circuit 20 is supplied to a semi-synchronous detecting circuit 22 through an intermediate frequency circuit 21. An output signal of a PLL synthesizer 23 is supplied to the semi-synchronous detecting circuit 22. The frequency of the output signal of the PLL synthesizer 23 is controlled with an output signal of a frequency combiner 32. The semi-synchronous detecting circuit 22 quadrature-detects the received signal.

An output signal of the semi-synchronous detecting circuit 22 is supplied to an A/D converter 24. The A/D converter 24 digitizes the output signal of the semi-synchronous detecting circuit 22. At this point, the sampling frequency of the A/D converter 24 is higher than the frequency of the PN code that has been spectrum-spread. In other words, the input signal of the A/D converter is oversampled. An output signal of the A/D converter 24 is supplied to fingers 25A, 25B, and 25C. In addition, the output signal of the A/D converter 24 is supplied to a searcher 28.

As described above, in the reception mode, signals are received through multi-paths. The fingers 25A, 25B, and 25C multiply the signals received through the multi-paths by the PN code so as to de-spread the received signals. In addition, the fingers 25A, 25B, and 25C output the levels of the signals received through the multi-paths and the frequency errors of these multi-paths.

The searcher 28 acquires the codes of the received signals and designates the codes for the paths. In other words, the searcher 28 has a de-spreading circuit that multiplies the received signals by the respective PN codes and de-spreads the received signals. The searcher 28 shifts the phases of the PN codes under the control of a controller 29 and obtains the correlation with the received codes. With the correlation values of the designated codes and the received codes, the codes for the respective paths are designated. The codes designated by the controller 29 are supplied to the fingers 25A, 25B, and 25C.

The received data for the respective paths demodulated by the fingers 25A, 25B, and 25C is supplied to a data combiner 30. The data combiner 30 combines the received data for the respective paths.

An output signal of the data combiner 30 is supplied to an AGC circuit 33.

The fingers 25A, 25B, and 25C obtain the intensities of the signals received through the respective paths. The intensities of the signals received through the respective path are supplied from the fingers 25A, 25B, and 25C to a RSSI combiner 31. The RSSI combiner 31 combines the intensities of the signals received through the respective paths. An output signal of the RSSI combiner 31 is supplied to the AGC circuit 33. The gain of the AGC circuit 33 is controlled so that the signal level of the received data becomes constant.

The frequency errors for the respective paths are supplied from the fingers 25A, 25B, and 25C to the frequency combiner 32. The frequency combiner 32 combines the frequency errors for the respective paths. An output signal of the frequency combiner 32 is supplied to the PLL synthesizer 11 and 23. Corresponding to the resultant frequency error, the frequencies of the PLL synthesizer 11 and 23 are controlled.

An output signal of an AGC circuit 33 is supplied to a de-interleaving circuit 34. The de-interleaving circuit 34 de-interleaves the received data that has been interleaved on the transmission side. An output signal of the de-interleaving circuit 34 is supplies to a Viterbi decoding circuit 35. The Viterbi decoding circuit 35 decodes a convolutional code with a soft determining process and a maximum likelihood decoding process. The Viterbi decoding circuit 35 performs an error correcting process. An output signal of the Viterbi decoding circuit 35 is supplied to an audio expanding circuit 36.

The audio expanding circuit 36 decompresses the audio signal that has been compressed with for example the QCELP method and decodes a digital audio signal. The digital audio signal is supplied to a D/A converter 37. The D/A converter 37 restores a digital audio signal to an analog audio signal. The analog audio signal is supplied to a speaker 38.

As described above, the fingers 25A, 25B, and 25C de-spread received signals acquired by the searcher 28 through paths so as to demodulate data.

Figure 5:
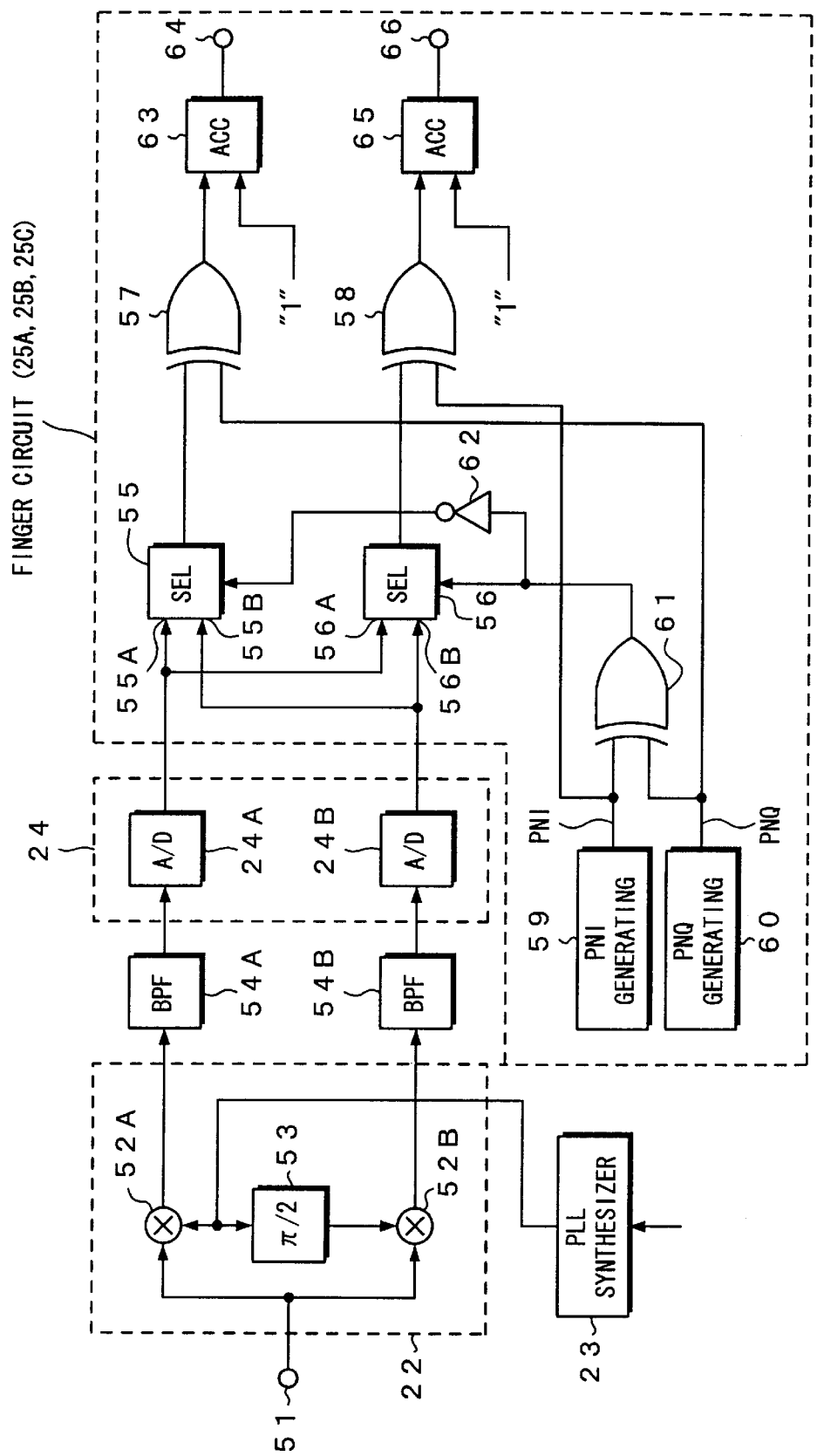
FIG. 5 is a block diagram showing an example of a de-spreading circuit of the portable telephone terminal unit of CDMA type according to the present invention.

FIG. 5 shows a practical structure of a de-spreading circuit of the fingers 25A, 25B, and 25C according to the present invention. The structures of the fingers 25A, 25B, and 25C are the same. For simplicity, next, only the structure of the finger 25A will be described.

In FIG. 5, an intermediate frequency signal is supplied from the intermediate frequency circuit 21 (see FIG. 4) to an input terminal 51. The intermediate frequency signal is supplied to multiplying circuits 52A and 52B of a semi-synchronous detecting circuit 22. An output signal of a PLL synthesizer 23 is supplied to the multiplying circuit 52A. In addition, the output signal of the PLL synthesizer 23 is supplied to the multiplying circuit 52B through a π/2 phase shifting circuit 53. The multiplying circuit 52A multiplies the intermediate frequency signal received from the input terminal 51 by the output signal of the PLL synthesizer 23. The multiplying circuit 51B multiplies the intermediate frequency signal received from the input terminal 51 by the output signal of the PLL synthesizer 23 through the π/2 delaying circuit 53.

The output signal of the PLL synthesizer 23 is controlled by the frequency combiner 32 (see FIG. 4) so that the frequency of the output signal of the PLL synthesizer 23 is the same as the frequency of the carrier of the intermediate frequency signal received from the input terminal 51. When the multiplying circuits 52A and 52B multiply the intermediate frequency signal received from the input terminal 51 by the output signal of the PLL synthesizer 23, the carrier component is canceled. Thus, the multiplying circuits 52A and 52B output the received signal of I channel and the received signal of Q channel.

Output signals of the multiplying circuits 52A and 52B are supplied to A/D converters 24A and 24B through band pass filters 54A and 54B, respectively.

The A/D converters 24A and 24B digitize the received signal of I channel and the received signal of Q channel.

An output signal of the A/D converter 24A is supplied to a terminal 55A of a selector 55 of the finger 25A (25B, or 25C). In addition, the output signal of the A/D converter 24A is supplied to a terminal 56A of a selector 56. An output signal of the A/D converter 24B is supplied to a terminal 55B of the selector 55. In addition, the output signal of the A/D converter 24B is supplied to a terminal 56B of the selector 55. An output signal of the selector 55 is supplied to a first input terminal of an EX-OR gate 57. An output signal of the selector 56 is supplied to a first input terminal of an EX-OR gate 58.

A PH code generating circuit 59 generates a PN code of I channel PNI. The PN code of I channel PNI is supplied from the PN code generating circuit 59 to a first input terminal of an EX-OR gate 61. In addition, the PN code of I channel PNI is supplied to a second input terminal of the EX-OR gate 58. A PN code generating circuit 60 generates a PN code of Q channel PNQ. The PN code of Q channel PNQ is supplied from the PN code generating circuit 60 to a second input terminal of the EX-OR gate 61. In addition, the PN code of Q channel PNQ is supplied to a second input terminal of the EX-OR gate 57.

An output signal of the EX-OR gate 61 is supplied as a select signal to the selector 56. In addition, the output signal of the EX-OR gate 61 is supplied to an inverter 62. The inverter 62 inverts the signal received from the EX-OR gate 61. An output signal of the inverter 62 is supplied to the selector 55. When the logic level of the select signal is "0", the selector 55 is switched to the terminal 55B side. When the logic level of the select signal is "1", the selector 55 is switched to the terminal 55A side. When the logic level of the select signal is "0", the selector 56 is switched to the terminal 56B side. When the logic level of the select signal is "1", the selector 56 is switched to the terminal 56A side.

The EX-OR gate 57 outputs a de-spread signal of I channel. The de-spread signal of I channel that is output from the EX-OR gate 57 is supplied to an accumulator 63 that converts a chip into a symbol. An output signal of the accumulator 63 is obtained from an output terminal 64. The EX-OR gate 58 outputs a de-spread signal of Q channel. The de-spread signal of Q channel that is output from the EX-OR gate 58 is supplied to an accumulator 65 that converts a chip into a symbol. An output signal of the accumulator 65 is obtained from an output terminal 66.

The selectors 55 and 56, the PN code generating circuits 59 and 60, the EX-OR gates 57 and 58, and the EX-OR gate 61 form a de-spreading circuit. The de-spreading circuit multiplies a signal by a complex conjugate so as to de-spread the signal.

In other words, the semi-synchronous detecting circuit 22 outputs a signal of I channel and a signal of Q channel. The output signals of the semi-synchronous detecting circuit 22 are expressed by a complex number as follows.

$$I + jQ \tag{1}$$

When the PN code of I channel to be de-spread and the PN code of Q channel to be de-spread are denoted by PNI and PNQ, respectively, the PN code sequence is expressed by a complex number as follows.

$$PNI + jPNQ \tag{2}$$

Since the de-spreading process is equivalent to a process for reversely rotating the phase of a signal, the signal expressed by a complex number as in Formula (1) is multiplied by a complex conjugate of a PN code expressed by a complex number as in Formula (2). Thus, the signal (I+jQ) as a complex number is de-spread as follows.

$$(I + jQ) \cdot (PNI - jPNQ) = (I \cdot PNI + Q \cdot PNQ) + \tag{3}$$
$$j(Q \cdot PNI - I \cdot PNQ)$$

In Formula (3), the real part and imaginary part become a de-spread output signal of I channel and a de-spread output signal of Q channel. Thus, the de-spread output signal of I channel I_OUT and the de-spread output signal of Q channel Q_OUT are expressed as follows.

$$I\_OUT = I \cdot PNI + Q \cdot PNQ \tag{4}$$

$$Q\_OUT = Q \cdot PNI - I \cdot PNQ \tag{5}$$

As shown in FIG. 5, the de-spreading circuit imcomposed of the selectors 55 and 56, the PN code generating circuits 59 and 60, the EX-OR gates 57 and 58, and the EX-OR gate 61 performs calculations equivalent to Formulas (4) and (5) and obtains a de-spread output signal of I channel and a de-spread output signal of Q channel.

In other words, as shown in FIG. 5, the PN code generating circuit 59 outputs a PN code of I channel PNI. The PN code generating circuit 60 outputs a PN code of Q channel PNQ. When the PN code of I channel PNI is the same as the PN code of Q channel PNQ (namely, PNI=PNQ), signals of which second terms (Q·PNQ) and (−I·PNQ) are removed from Formulas (4) and (5) are output as a de-spread output signal of I channel I_OUT and a de-spread output signal of Q channel Q_OUT from the output terminals 64 and 66, respectively. Thus, the following relations are satisfied.

$$I\_OUT = I \cdot PNI \quad (6)$$

$$Q\_OUT = Q \cdot PNI \quad (7)$$

When the PN code of I channel PNI is different from the PN code of Q channel PNQ (namely, PNI≠PNQ), signals of which first terms (I·PNI) and (Q·PUI) are removed from Formulas (4) and (5) are output as a de-spread output signal of I channel I_OUT and a de-spread output signal of Q channel Q_OUT from the output terminals 64 and 66, respectively. Thus, the following relations are satisfied.

$$I\_OUT = Q \cdot PNQ \quad (8)$$

$$Q\_OUT = -I \cdot PNQ \quad (9)$$

Thus, when the period of which the PN code of I channel PNI is the same as the PN code of Q channel PNQ and the period of which the PN code of I channel PNI is different from the PN code of Q channel PNQ are added, although the energy thereof becomes −3 dB, calculations equivalent to Formulas (4) and (5) are performed.

In this case, the de-spreading process that multiplies a signal by a complex conjugate and de-spreads the signal is accomplished by the selectors 55 and 56, the PN code generating circuits 59 and 60, the EX-OR gates 57 and 58, and the EX-OR gate 61. Thus, the circuit scale can be remarkably reduced.

Next, the calculating process equivalent to Formulas (4) and (5) performed by the de-spreading circuit composed of the selectors 55 and 56, the PN code generating circuits 59 and 60, the EX-OR gates 57 and 58, and the EX-OR gate 61 will be described.

The A/D converters 24A and 24B digitize a signal of I channel and a signal of Q channel. In this case, the A/D converters 24A and 24B output digital signals that are positive-negative symmetrical with respect to zero (for example, digital signals represented by one's complements). When signals are represented by one's complements, the sign thereof is inverted by inverting each bit.

When the PN code of I channel PNI is the same as the PN code of Q channel PNQ (namely, PNI=PNQ), the logic level of the output signal of the EX-OR gate 61 becomes "0". When the logic level of the output signal of the EX-OR gate 61 is "0", the selector 55 is switched to the terminal 55A side and the selector 56 is switched to the terminal 56B side. Thus, the selector 55 outputs a signal of I channel. The selector 56 outputs a signal of Q channel.

The signal of I channel is supplied from the selector 55 to the first input terminal of the EX-OR gate 57. The PN code of Q channel PNQ is supplied from the PN code generating circuit 60 to the second input terminal of the EX-OR gate 57. The EX-OR gate 57 multiplies the signal of I channel received from the selector 55 by the PN code of Q channel PNQ received from the PN code generating circuit 60. Thus, the de-spread output signal of I channel I-OUT received from the EX-OR gate 57 is expressed by:

$$I\_OUT = I \cdot PNQ$$

Since the PN code of I channel PNI is the same as the PN code of Q channel, the following relation is satisfied.

$$I\_OUT = I \cdot PNQ = I \cdot PNI$$

The result is the same as an output signal of I channel in the case that the PN code of I channel PNI is the same as the PN code of Q channel PNQ expressed by Formula (6).

The signal of Q channel is supplied from the selector 56 to the first input terminal of the EX-OR gate 58. The PN code of I channel is supplied from the PN code generating circuit 59 to the second input terminal of the EX-OR gate 58. The EX-OR gate 58 multiplies the signal of Q channel received from the selector 56 by the PN code of I channel PNI received from the PN code generating circuit 59. Thus, the de-spread output signal Q_OUT of Q channel received from the EX-OR gate 58 is expressed by:

$$Q\_OUT = Q \cdot PNI.$$

The result is the same as an output signal of Q channel in the case that the PN code of I channel PNI is the same as the PN code of Q channel PNQ expressed by Formula (7).

Thus, when the PN code of I channel PNI is the same as the PN code PNQ of Q channel, the de-spread output signal of I channel I_OUT and the de-spread output signal of Q channel Q_OUT are obtained as expressed by Formulas (6) and (7).

When the PN code of I channel PNI is different from the PN code PNQ of Q channel (namely, PNI≠PNQ), the logic level of the output signal of the EX-OR gate 61 becomes "1". When the logic level of the output signal of the EX-OR gate 61 is "1", the selector 55 is switched to the terminal 55B side and the selector 56 is switched to the terminal 56A side. Thus, the selector 55 outputs the signal of Q channel. The selector 56 outputs the signal of I channel.

The signal of Q channel is supplied from the selector 55 to the first input terminal of the EX-OR gate 57. The PN code of Q channel PNQ is supplied from the PN code generating circuit 60 to the second input terminal of the EX-OR gate 57. Thus, the EX-OR gate 57 multiplies the signal of Q channel received from the selector 55 by the PN code of Q channel PNQ received from the PN code generating circuit 60. Consequently, the de-spread output signal of I channel I_OUT received from the EX-OR gate 57 is expressed by:

$$I\_OUT = Q \cdot PNQ.$$

The result is the same as an output signal of I channel in the case that the PN code of I channel PNI is different from the PN code of Q channel PNQ.

On the other hand, the signal of I channel received from the selector 56 is supplied to the first input terminal of the EX-OR gate 58. The PN code of I channel PNI is supplied from the PN code generating circuit 59 to the second input terminal of the EX-OR gate 58 (namely, PNI PNQ). The sign is inverted by inverting each bit. Thus, the EX-OR gate 58 multiplies the signal of I channel received from the selector 56 by the PN code PNI of I channel received from the PN code generating circuit 59, thereby inverting the sign. Consequently, the de-spread output signal of Q channel Q_OUT received from the EX-OR gate 58 is expressed by:

$$Q\_OUT = -I \cdot PNI.$$

Thus, the result is the same as an output signal of Q channel in the case that the PN code of I channel PNI is different from the PN code of Q channel PNQ expressed by Formula (9).

In addition, the operation of the de-spreading circuit according to the present invention is equivalent to the operation of which the I axis and Q axis are rotated without changing the signal.

Figure 6A:
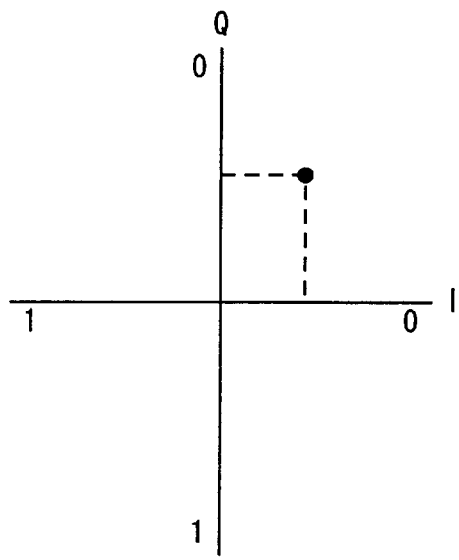
FIGS. 6A to 6D are graphs for explaining the de-spreading circuit of the portable telephone terminal unit of CDMA type according to the present invention.

In other words, when the selectors 55 and 56 are switched, the I axis and Q axis are substituted. Now, it is assumed that the output signals of I and Q channels (Ich, Qch) received from the A/D converters 24A and 24B are (−2.5, −3.5). When the PN code of I channel PNI and the PN code PNQ of Q channel PNQ (PNI, PNQ) are (0, 0), the selector 55 is switched to the terminal 55A side and the selector 56 is switched to the terminal 56B side. The coordinate axes at this point are represented as shown in FIG. 6A.

Figure 6B:
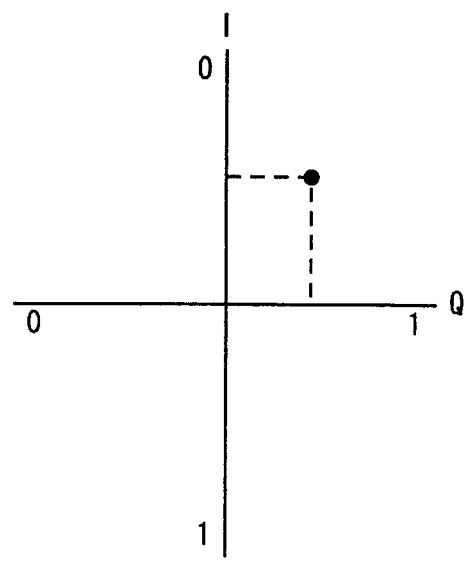

Next, when the PN code of I channel PNI and the PN code of Q channel PNQ (PNI, PNQ) become (1, 0), since (PNI≠PNQ), the selector 55 is switched to the terminal 55B side and the selector 56 is switched to the terminal 56A side. Thus, the I axis and Q axis are substituted. In addition, since the PN code of I channel PNI is "1", the sign of the I channel is inverted. Consequently, as shown in FIG. 6B, the coordinate axes are rotated by 90 degrees.

Figure 6C:
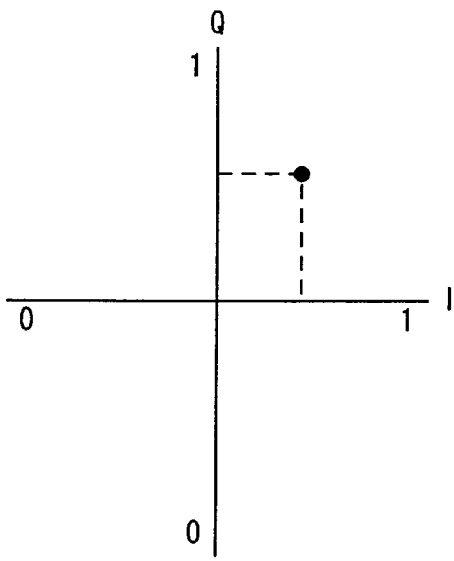

Next, when the PN code of I channel PNI and the PN code of Q channel PNQ (PNI, PNQ) become (1, 1), since the selector 55 is switched to the terminal 55A side and the selector 56 is switched to the terminal 56B side, the I axis and the Q axis are restored. In addition, since the PN code of I channel PNI and the PN code of Q channel PNQ are "1", the signs of the I channel and Q channel are inverted. Thus, at this point, as shown in FIG. 6C, the coordinate axes are further rotated by 90 degrees.

Figure 6D:
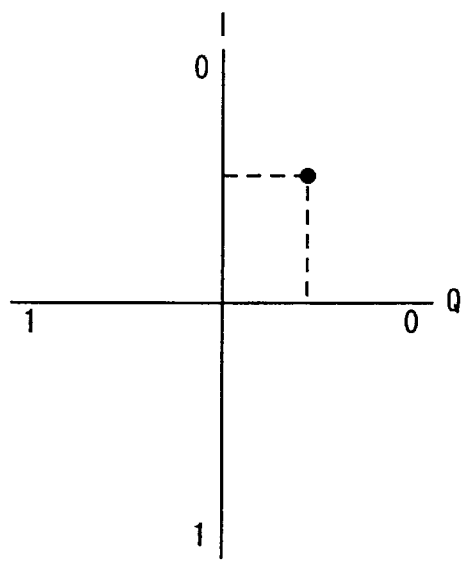

When the PN code of I channel PNI and the PN code of Q channel PNQ (PNI, PNQ) become (0, 1), the selector 55 is switched to the terminal 55B side and the selector 56 is switched to the terminal 56A side. Thus, the I axis and Q axis are substituted. In addition, since the PN code of Q channel PNQ is "1", the sign of the Q channel is inverted. Consequently, at this point, as shown in FIG. 6D, the coordinate axes are further rotated by 90 degrees.

In the above-described embodiment, the A/D converters 24A and 24B output digital signals expressed by one's complements. However, conventional A/D converters output digital signals expressed by two's complements. Thus, the output signals of the A/D converters 24A and 24B should be compensated.

In the case that the A/D converters 24A and 24B output digital signals expressed by two's complements, when the digital signals are expressed by one's complements, the A/D converters 24A and 24B output values as shown in FIG. 7. In other words, two's complement of "0000" is "0". As values that are positive-negative symmetrical with respect to zero, there is "0" between "0000" and "1111". Output values "0000" and "1111" of the A/D converters 24A and 24B are treated as "0.5" and "−0.5", respectively. When the A/D converters 24A and 24B output "0111", the value is treated as "7.5". When the A/D converters 24A and 24B output "0110", the value is treated as "6.5". Thus, as described above, output signals of the A/D converters 24A and 24B expressed by two's complements are treated as digital signals expressed by one's complements.

In this case, there is decimal information such as "0.5". Thus, when the accumulators 63 and 65 convert chips into symbols, they add data "1" every two accumulations. The addition of data "1" every two accumulations is equivalent to an addition of "0.5". Thus, decimal information is compensated.

Instead of adding data "1" every two accumulations, one bit may be added to the least significant bit of each of the accumulators 63 and 65. When one bit is added to the least significant bit, the value is multiplied by two. Thus, the decimal information is compensated.

According to the present invention, depending on whether or not the PN code of I channel is the same as the PN code of Q channel, the selectors that select a received output signal of P channel and a received output signal of Q channel are switched. Thus, a structure of a circuit that multiplies a signal by a complex conjugate and de-spreads the signal is accomplished without need to use a plurality of multiplying circuits, an adding circuit, and a subtracting circuit. Consequently, the circuit scale can be reduced.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A demodulating method for demodulating an input signal having two orthogonal components fed in to respective in-phase and quadrature channels, comprising the steps of:

generating two decoding signals; and selecting between the two orthogonal components in the in-phase channel and between the two orthogonal components in the quadrature channel according to a relative correlation of the two decoding signals;

processing each of the two orthogonal components to generate respective output signals, wherein the step of processing is performed by equivalently calculating a complex conjugate.

2. The demodulating method as set forth in claim 1, wherein the step of generating two decoding signals includes generating a PN code.

3. The demodulating method as set forth in claim 1, wherein the two orthogonal components processed in the step of processing are represented by one's complement, and the demodulating method further comprises the step of adding a predetermined constant to each output signal at a predetermined interval, the step of processing being followed by the step of adding.

4. A receiving method for demodulating a received signal having two orthogonal components, comprising the steps of:

receiving a high frequency signal and converting the high frequency signal into a low frequency signal having the two orthogonal components both forming inputs to an in-phase channel and inputs to a quadrature channel;

generating two decoding signals; and selecting between the two orthogonal inputs in each channel in accordance with a relative correlation between the two decoding signals, generating an output signal in each of the channels by processing the two orthogonal components of the low frequency signal in each of the channels, wherein the step of processing is performed by equivalently calculating a complex conjugate.

5. The receiving method as set forth in claim 4, wherein the step of generating two decoding signals includes generating a PN code.

6. The receiving method as set forth in claim 4, wherein the two orthogonal components processed in the step of processing are represented by one's complement, and the receiving method further comprises the step of adding a predetermined constant to the output signal at a predetermined interval, the step processing being followed by the step adding.

7. A demodulating apparatus for demodulating an input signal having two orthogonal components, comprising:

signal generating means for generating two decoding signals; and signal selecting and processing means for inputting the two orthogonal components in each of an in-phase channel and a quadrature channel and generating an output signal from each channel by processing the two orthogonal components in in respective channels, in which an input to each channel is selected according to a relative correlation of the two decoding signals generated by said signal generating means, wherein said signal selecting and processing means equivalently calculates a complex conjugate.

8. The demodulating apparatus as set forth in claim 7, wherein said signal generating means generates a PN code.

9. The demodulating apparatus as set forth in claim 7, wherein the two orthogonal components input to said signal selecting means are represented by one's complement, and the demodulating apparatus further comprises compensating means, disposed downstream of said signal selecting and processing means, for adding a predetermined constant to the output signal at a predetermined interval.

10. The demodulating apparatus as set forth in claim 7, wherein the output signal is generated by said signal selecting and processing means after the two decoding signals generated by said signal generation means have been exclusive-ORed.

11. The demodulating apparatus as set forth in claim 9, wherein the predetermined constant is 1 and the predetermined interval is once every two additions.

12. The demodulating apparatus as set forth in claim 9, wherein the predetermined constant is one bit added to LSB of the output signal and the predetermined interval is once every addition.

13. A receiving apparatus for demodulating a received signal having two orthogonal components, comprising:

receiving means for receiving a high frequency signal and converting the high frequency signal into a low frequency signal including two orthogonal component signals being fed as inputs to an in-phase channel and as inputs to a quadrature channel;

signal generating means for generating two decoding signals; and signal selecting and processing means for selecting between the two orthogonal component signals supplied by said receiving means in the in-phase channel and selecting between the two orthogonal component signals in the quadrature channel and generating an output signal by processing both of the two orthogonal component signals in each of the in-phase channel and the quadrature channel, in which the input signal is selected according to a relative correlation of the two decoding signals generated by said signal generating means, wherein said signal selecting and processing means equivalently calculates a complex conjugate.

14. The receiving apparatus as set forth in claim 13, wherein said signal generating means generates a PU code and the receiving apparatus receives a CDMA signal.

15. The receiving apparatus as set forth in claim 13, wherein the two orthogonal component signals input to both of the in-phase channel and the quadrature channel of said signal selecting and processing means are represented by one's complement, and the receiving apparatus further comprises compensating means, disposed downstream of said signal selecting and processing means, for adding a predetermined constant to the output signal at a predetermined interval.

16. The receiving apparatus as set forth in claim 13, wherein the output signal of said signal selecting and processing means is generated after the two decoding signals generated by said signal generating means has been exclusive-ORed.

17. The receiving apparatus as set forth in claim 15, wherein the predetermined constant is 1 and the predetermined interval is once every two additions.

18. The receiving apparatus as set forth in claim 15, wherein the predetermined constant is one bit added to LSB of the output signal and the predetermined interval is once every addition.

19. A communication apparatus for demodulating a signal having two orthogonal components, comprising:

transmitting means for modulating an information signal and transmitting the modulated signal;

receiving means for receiving a high frequency signal and converting the high frequency signal into a low frequency signal including two orthogonal component signals fed as respective inputs to an in-phase channel and a quadrature channel; and signal generating means for generating two decoding signals; and signal selecting and processing means for selecting between the two orthogonal component signals supplied by said receiving means in the in-phase channel and selecting between the two orthogonal component signals in the quadrature channel and generating an output signal by processing both of the two orthogonal component signals in each of the in-phase channel and the quadrature channel, in which the input signal is selected according to a relative correlation of the two decoding signals generated by said signal generating means, wherein said signal selecting and processing means equivalently calculates a complex conjugate.

20. The communication apparatus as set forth in claim 19, wherein said signal generating means generates a PN code and the communication apparatus transmits and receives a CDMA signal.

21. The communication apparatus as set forth in claim 19, wherein the two orthogonal component signals input to said signal selecting and processing means are represented by one's complement, and the communication apparatus further comprises compensating means, disposed downstream of said signal selecting and processing means, for adding a predetermined constant to the output signal at a predetermined interval.

22. The communication apparatus as set forth in claim 19, wherein the output signal of said signal selecting and processing means is generated after the two decoding signals generated by said signal generating means have been exclusive-ORed.

23. The communication apparatus as set forth in claim 21, wherein the predetermined constant is 1 and the predetermined interval is once every two additions.

24. The communication apparatus as set forth in claim 21, wherein the predetermined constant is one bit added to LSB of the output signal and the predetermined interval is once every addition.

25. A method for demodulating a signal having two orthogonal components, the method comprising the steps of:

generating two PN decoding signals respectively for the two orthogonal components determining a relative correlation of the two decoding signals generated in the step of generating;

varying an output signal state by selecting between the two orthogonal components in each of an in-phase channel and a quadrature channel based on a correlation result obtained in said step of determining a relative correlation; and processing each of the selected ones of the two orthogonal components by equivalently calculating a complex conjugate.

\* \* \* \* \*